(12) United States Patent
Ryu et al.

(10) Patent No.: US 9,741,393 B2
(45) Date of Patent: Aug. 22, 2017

(54) METHOD AND METHOD FOR SHORTENING VIDEO WITH EVENT PRESERVATION

(71) Applicant: Hanwha Techwin Co., Ltd., Changwon-si (KR)

(72) Inventors: Yeongeol Ryu, Changwon-si (KR); Sangji Park, Changwon-si (KR); Junho Cha, Changwon-si (KR); Seungin Noh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 15/065,039

(22) Filed: Mar. 9, 2016

(65) Prior Publication Data

US 2017/0069348 A1    Mar. 9, 2017

(30) Foreign Application Priority Data

Sep. 8, 2015 (KR) .......................... 10-2015-0127035

(51) Int. Cl.
| | |
|---|---|
| H04N 9/80 | (2006.01) |
| G11B 27/031 | (2006.01) |
| G11B 27/00 | (2006.01) |
| G11B 27/30 | (2006.01) |
| G06K 9/00 | (2006.01) |

(52) U.S. Cl.
CPC ........ G11B 27/031 (2013.01); G06K 9/00751 (2013.01); G11B 27/002 (2013.01); G11B 27/005 (2013.01); G11B 27/3081 (2013.01); G06K 2009/00738 (2013.01)

(58) Field of Classification Search
CPC  G06K 9/00751; G11B 27/002; G11B 27/005; G11B 27/3081
USPC ......................................... 386/241, 346–348
See application file for complete search history.

(56) References Cited

U.S. PATENT DOCUMENTS

| | | | |
|---|---|---|---|
| 6,560,281 B1 * | 5/2003 | Black ................ | G06F 17/30793 345/158 |
| 7,184,100 B1 * | 2/2007 | Wilf ....................... | G11B 27/28 348/700 |
| 9,191,589 B2 | 11/2015 | Kuwabara et al. | |
| 9,202,128 B2 | 12/2015 | Chon et al. | |
| 2003/0231867 A1 * | 12/2003 | Gates ..................... | H04N 5/783 386/344 |
| 2007/0286500 A1 * | 12/2007 | Akiyoshi ............ | G06K 9/4671 382/232 |
| 2008/0263012 A1 * | 10/2008 | Jones ................. | G06F 17/30811 |

(Continued)

FOREIGN PATENT DOCUMENTS

| | | |
|---|---|---|
| JP | 2013-122639 A | 6/2013 |
| KR | 10-2013-0082308 A | 7/2013 |
| KR | 10-1396838 B1 | 5/2014 |

*Primary Examiner* — Helen Shibru
(74) *Attorney, Agent, or Firm* — Sughrue Mion, PLLC

(57) ABSTRACT

A method of shortening a video includes: determining shortened key frames by selecting one key frame for every preset time interval of a time line of the video or for every preset position interval of a camera which captures the video, from among original key frames of the video; determining event key frames from which an event is detected, from among the original key frames; determining event-preserved key frames using the shortened key frames and the event key frames; and generating a shortened video using the event-preserved key frames.

20 Claims, 20 Drawing Sheets

(56) References Cited

U.S. PATENT DOCUMENTS

| | | | |
|---|---|---|---|
| 2010/0262913 A1* | 10/2010 | Takagi | G06F 17/30017 715/723 |
| 2011/0013882 A1* | 1/2011 | Kusunoki | G11B 27/034 386/241 |
| 2011/0310217 A1* | 12/2011 | Lee | H04N 7/15 348/14.08 |
| 2014/0336511 A1* | 11/2014 | Hoshino | A61B 8/00 600/443 |
| 2016/0029076 A1* | 1/2016 | Huber | H04L 65/4076 725/32 |
| 2016/0142750 A1* | 5/2016 | Huber | H04L 65/605 725/116 |
| 2016/0283519 A1* | 9/2016 | Glasgow | G06F 3/0482 |

* cited by examiner

METHOD AND METHOD FOR SHORTENING VIDEO WITH EVENT PRESERVATION

CROSS-REFERENCE TO THE RELATED APPLICATION

This application claims priority from Korean Patent Application No. 10-2015-0127035, filed on Sep. 8, 2015, in the Korean Intellectual Property Office, the disclosure of which is incorporated herein in its entirety by reference.

BACKGROUND

1. Field

One or more exemplary embodiments relate to a method and an apparatus for processing a video, and more particularly, to a method and an apparatus for shortening a video without losing an event.

2. Description of the Related Art

Capturing an image of a subject at a low speed and reproducing the image at a speed higher than the capturing speed, or shortening a video captured at a normal speed may be used for dramatically showing the subject which moves slowly.

SUMMARY

One or more exemplary embodiments may include a method and an apparatus for shortening a video, that prevent an event from being lost during a video shortening process.

One or more exemplary embodiments include a method and an apparatus that may reduce shaking of image, which is likely to occur when frames are shortened and reproduced, by reducing a change in camera position between the frames of the shortened video.

One or more exemplary embodiments include a method and apparatus for shortening a video that rapidly reduce shaking of shake even when a reproduction speed is changed during video reproduction, by reperforming calculation only on key frames that come after the time point when the reproduction speed has been changed on a time line of the shortened video.

Various aspects will be set forth in part in the description which follows and, in part, will be apparent from the description, or may be learned by practice of the presented embodiments.

According to an aspect of an exemplary embodiment, there is provided a method of shortening a video which includes: determining shortened key frames by selecting one key frame for every preset time interval of a time line of the video or for every preset position interval of a camera which captures the video, from among original key frames of the video; determining event key frames from which an event is detected, from among the original key frames; determining event-preserved key frames using the shortened key frames and the event key frames; and generating a shortened video using the event-preserved key frames.

The generating may include correcting a position of each of the event-preserved key frames on a timeline of the shortened video to reduce a change in camera position between two adjacent event-preserved key frames based on camera positions corresponding to the event-preserved key frames.

The generating may include selecting to-be-reproduced key frames, which are included in the shortened video, from among the event-preserved key frames so that a number of the to-be-reproduced key frames corresponds to a video reproduction speed.

The determining of the event key frames may include determining key frames in which a motion of a foreground is detected, from among the original key frames, as the event key frames.

The determining of the event key frames may include determining key frames satisfying a preset event condition from among the original key frames as the event key frames.

The determining of the shortened key frames may include selecting one key frame among one or more original key frames which are captured at camera positions within each preset position interval.

The determining of the shortened key frames may include: detecting a motion of a background in the original key frames; and calculating camera positions corresponding to the original key frames based on the motion of the background.

The determining of the shortened key frames may include detecting a motion of a foreground and a motion of a background in the original key frames, and the determining of the event key frames may include determining key frames in which the motion of the foreground is detected, from among the original key frames, as the event key frames.

The above-described method may further include, when the video reproduction speed is changed during reproduction of the shortened video, reselecting the to-be-reproduced key frames from among the event-preserved key frames that come after a time point when the video reproduction speed has been changed on a time line of the shortened video so that a number of the reselected to-be-reproduced key frames corresponds to the changed video reproduction speed.

The generating may include performing image rendering based on the event-preserved key frames.

The determining of the event-preserved key frames may include: determining camera positions corresponding to the shortened key frames and camera positions corresponding to the event key frames; and determining the duplicate key frames from among the shortened key frames, camera positions of the duplicate key frames existing within a preset range from camera positions of the event key frames.

According to another aspect of an exemplary embodiment, there is provided an apparatus for shortening a video, the apparatus including: at least one processor configured to implement: a shortened key frame determiner configured to determine shortened key frames by selecting one key frame for every preset time interval of a time line of the video or for every preset position interval of a camera which captures the video, from among original key frames of the video; an event key frame determiner configured to determine event key frames from which an event is detected, from among the original key frames; an event-preserved key frame determiner configured to determine event-preserved key frames using the shortened key frames and the event key frames; and an video generator configured to generate a shortened video using the event-preserved key frames.

The at least one processor may be further configured to implement a key frame position corrector configured to correct a position of each of the event-preserved key frames on a timeline of the shortened video to reduce a change in camera position between two adjacent event-preserved key frames based on camera positions corresponding to the event-preserved key frames.

The at least one processor may be further configured to implement a to-be-reproduced key frame selector configured to select to-be-reproduced key frames, which are included in the shortened video, from among the even-preserved key frames so that a number of the to-be-reproduced key frames corresponds to a video reproduction speed.

The event key frame determiner may determine key frames in which a motion of a foreground is detected, from among the original key frames, as the event key frames.

The event key frame determiner may determine key frames satisfying a preset event condition from among the original key frames as the event key frames.

The shortened key frame determiner may select one key frame among one or more original key frames which are captured at camera positions within each preset position interval.

The shortened key frame determiner may detect a motion of a background in the original key frames and calculate camera positions corresponding to the original key frames based on the motion of the background. The shortened key frame determiner may detect a motion of a foreground and a motion of a background in the original key frames, and the event key frame determiner may determine key frames in which the motion of the foreground is detected, from among the original key frames, as the event key frames.

When the video reproduction speed is changed during reproduction of the shortened video, the to-be-reproduced key frame selector may reselect the to-be-reproduced key frames from among the event-preserved key frames that come after a time point when the video reproduction speed has been changed on a time line of the shortened video so that a number of the reselected to-be-reproduced key frames corresponds to the changed video reproduction speed.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF EXEMPLARY EMBODIMENTS

Figure 1:
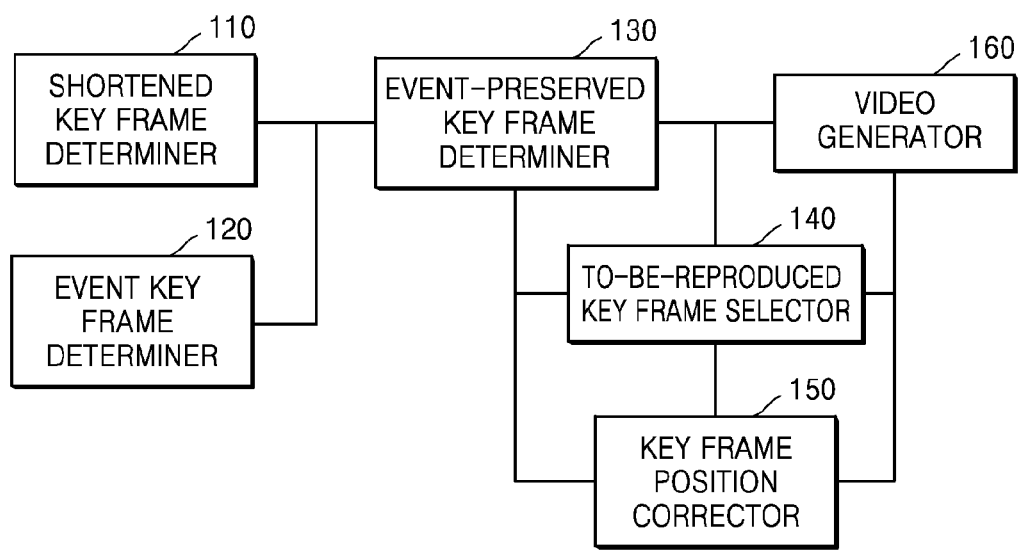
FIG. 1 is a block diagram illustrating a configuration of an apparatus for shortening a video according to an exemplary embodiment.

As the inventive concept allows for various changes and numerous embodiments, exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description of the inventive concept, certain detailed explanations of the related art are omitted when it is deemed that they may unnecessarily obscure the essence of the inventive concept.

While such terms as "first", "second", etc., may be used to describe various components, such components must not be limited to the above terms. The above terms are used only to distinguish one component from another.

The terms used in the present specification are merely used to describe exemplary embodiments, and are not intended to limit the inventive concept. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The inventive concept may be described in terms of functional block components and various processing steps. Such functional blocks may be realized by any number of hardware and/or software components configured to perform the specified functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the inventive concept are implemented using software programming or software elements, the inventive concept may be implemented with any programming or scripting language such as C, C++, Java, assembler language, or the like, with the various algorithms being implemented with any combination of data structures, objects, processes, routines, or other programming elements. Functional aspects may be implemented in algorithms that are executed on one or more processors. Furthermore, the inventive concept could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

In the specification and the drawings, elements having substantially the same configurations are denoted by the same reference numerals and a duplicate explanation thereof will not be given.

As used herein, the term "and/or" includes any and all combinations of one or more of the associated listed items. Expressions such as "at least one of" when preceding a list of elements, modify the entire list of elements and do not modify the individual elements of the list.

FIG. 1 is a block diagram illustrating a configuration of an apparatus for shortening a video, according to an exemplary embodiment.

Referring to FIG. 1, the apparatus may include a shortened key frame determiner 110, an event key frame determiner 120, an event-preserved key frame determiner 130, a to-be-reproduced key frame selector 140, a key frame position corrector 150, and a video generator 160. A "key frame" may refer to a frame having complete image information from among frames included in a video.

The shortened key frame determiner 110 determines shortened key frames by selecting key frames for every preset interval from among original key frames.

The original key frames may be main frames having complete image information from among frames included in an original video.

The preset interval may include at least one of a preset time interval and a preset position interval.

The shortened key frame determiner 110 may determine shortened key frames by selecting one key frame for every preset time interval. For example, when a preset time interval is 1 second, the shortened key frame determiner 110 may determine shortened key frames by selecting one key frame for every 1 second in the original video.

The position interval may be related to a camera position. The camera position is a relative position value of a point at which a video is captured and may be represented by two-dimensional (2D) or three-dimensional (3D) coordinate values.

The shortened key frame determiner 110 may detect a motion of a background in the original key frames and calculate camera positions corresponding to the original key frames by using the motion of the background.

According to an exemplary embodiment, a camera position may be calculated using various algorithms. In an exemplary embodiment, a video may be used as an input value and an amount of motion in the background may be obtained as an output value. However, an algorithm for calculating the camera position is not limited thereto and may vary according to an exemplary embodiment.

The shortened key frame determiner 110 may determine shortened key frames by selecting key frames to include one camera position in each preset position interval. In other words, only one key frame may be selected among multiple key frames which are captured at camera positions of each position interval.

In an exemplary embodiment, the shortened key frame determiner 110 may detect a motion of a foreground and a motion of a background simultaneously in the original key frames.

According to an exemplary embodiment, the shortened key frame determiner 110 may include an optical flow calculator configured to calculate an optical flow of the original key frames and a motion segmentation unit configured to separate a foreground and a background in each of the original key frames based on the calculated optical flow. In this case, the shortened key frame determiner 110 may calculate an optical flow, separate a foreground and a background in each of the original key frames based on the optical flow to detect a motion of the foreground and a motion of the background simultaneously.

However, an algorithm for simultaneously detecting a motion of a foreground and a motion of a background is not limited thereto, and a different algorithm may be used according to an exemplary embodiment.

The event key frame determiner 120 may determine event key frames by selecting key frames corresponding to an event from among the original key frames.

The event may be meaningful information included in the original key frames. For example, the event may be object motion information or information about an object of a user's interest.

The event key frame determiner 120 may determine a motion of a foreground in the original key frames and determine key frames in which the motion of the foreground is detected as event key frames from among the original key frames.

A method of detecting a motion of a foreground may use various algorithms, and is not limited to a specific algorithm.

In an exemplary embodiment, the event key frame determiner 120 may determine key frames satisfying a preset event condition as event key frames from among the original key frames. The preset event condition may be defined by a user.

For example, when the user-defined event condition is an audio event object, the event key frame determiner 120 may detect a time interval corresponding to the audio event object from among audio data included in the original video and determine that key frames in the time interval satisfy the user-defined event condition. Examples of the audio event object may include, but are not limited to, a tire friction sound and a human scream.

Alternatively, when the user-defined event condition is a video event object, the event key frame determiner 120 may determine that key frames corresponding to the video event object from among the original key frames satisfy the user-defined event condition. Examples of the video event object may include, but are not limited to, a human face and a solid object recognizable with a marker.

In an exemplary embodiment, when the shortened key frame determiner 110 simultaneously detects a motion of a foreground and a motion of a background in the original key frames, the event key frame determiner 120 may determine event key frames using the motion of the foreground detected by the shortened key frame determiner 110 without additionally detecting a motion of a foreground.

The event-preserved key frame determiner 130 may determine event-preserved key frames using the shortened key frames and the event key frames.

The event-preserved key frames may be key frames in which information about an event that may be missed during a process of determining the shortened key frames from among the original key frames is supplemented using the event key frames.

The event-preserved key frame determiner 130 may determine the shortened key frames and the event key frames as event-preserved key frames.

In an exemplary embodiment, the event-preserved key frame determiner 130 may remove duplicate key frames from among the shortened key frames and the event key frames, when determining the event-preserved key frames. Duplicate key frame does not necessarily mean that one key frame is visually identical to another key frame. If a key frame X is similar to another key frame Y in terms of camera position, X and Y may be a duplicate key frame of each other.

In an exemplary embodiment, the event-preserved key frame determiner 130 may set a camera position-based duplication range from the event key frames, determine that the shortened key frames existing within the duplication range as duplicate key frames, and determine key frames other than the duplicate key frames as event-preserved key frames.

That is, when a camera position corresponding to shortened key frames exists within a preset range from among camera positions corresponding to the event key frames, the event-preserved key frame determiner 130 may determine that such shortened key frames are duplicate key frames. Thus, the event-preserved key frame determiner 130 may determine key frames other than the duplicate key frames from among shortened key frames or event key frames as event-preserved key frames.

As such, the apparatus according to an exemplary embodiment may prevent an event from being lost, when frames are shortened and reproduced, by including event key frames in a shortened video.

The to-be-reproduced key frame selector 140 may select to-be-reproduced key frames from among the event-preserved key frames. The number of the to-be-reproduced key frames, i.e., the selected event-preserved key frames, may be determined based on a video reproduction speed.

For example, according to the video reproduction speed, all of the event-preserved key frames may be reproduced or some of the event-preserved key frames may be skipped.

The number of the to-be-reproduced key frames may be set to be inversely proportional to the video reproduction speed.

In an exemplary embodiment, when the video reproduction speed is changed during video reproduction, the to-be-reproduced key frame selector 140 may reselect to-be-reproduced key frames from among the event-preserved key frames which comes after the time point when the video reproduction speed has been changed. The number of the reselected to-be-reproduced key frames is determined according to the changed video reproduction speed.

The key frame position corrector 150 may correct a position of each of the event-preserved key frames on a timeline to reduce a change in camera position between two adjacent event-preserved key frames, using camera positions corresponding to the event-preserved key frames.

For example, in order to reduce a change in camera position, the key frame position corrector 150 may smooth a camera path that connects camera positions and correct a position of each of the event-preserved key frames in accordance with the smoothed camera path.

A method of correcting a position of each of key frames according to an exemplary embodiment may use various algorithms, and is not limited to a specific algorithm.

As such, the apparatus may reduce shaking of image, which occurs when frames are shortened and reproduced, by reducing a change in camera position.

After the to-be-reproduced key frame selector 140 has selected to-be-reproduced key frames, the key frame position corrector 150 may correct a position of each of the to-be-reproduced key frames, instead of the event-preserved key frames.

In an exemplary embodiment, when the to-be-reproduced key frame selector 140 reselects to-be-reproduced key frames from among the event-preserved key frames after a video reproduction speed has been changed, the key frame position corrector 150 may correct a position of each of the reselected to-be-reproduced key frames.

As such, even when a reproduction speed is changed during video reproduction, the apparatus according to an exemplary embodiment may rapidly reduce shaking of image by reperforming calculation only on key frames that come after the time point when the reproduction speed has been changed.

The video generator 160 may generate a video by performing image rendering based on the event-preserved key frames.

After the to-be-reproduced key frame selector 140 has selected to-be-reproduced key frames, the video generator 160 may generate a video based on the to-be-reproduced key frames, instead of the event-preserved key frames.

In an exemplary embodiment, when the to-be-reproduced key frame selector 140 reselects to-be-reproduced key frames from among the event-preserved key frames positioned behind the time point when a video reproduction speed has been changed on a time line, the video generator 160 may regenerate a video based on the reselected to-be-reproduced key frames.

Figure 2:
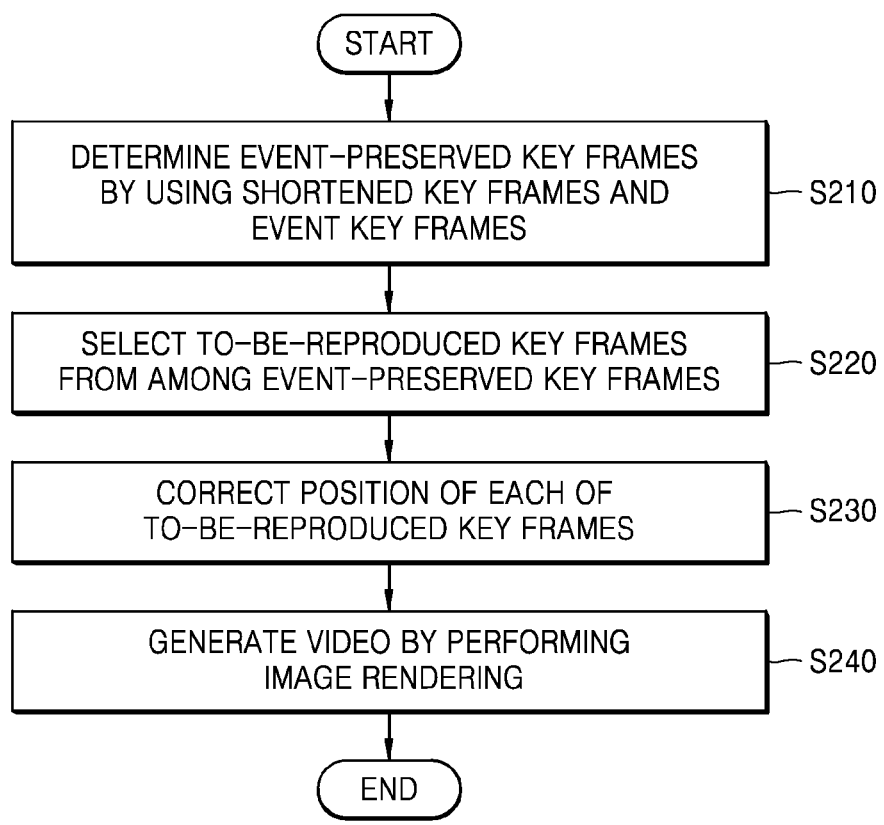
FIG. 2 is a flowchart illustrating a method of shortening a video, according to an exemplary embodiment.

FIG. 2 is a flowchart illustrating a method of shortening a video, according to an exemplary embodiment.

Referring to FIG. 2, the method includes operation S210 in which the event-preserved key frame determiner 130 determines event-preserved key frames by using shortened key frames and event key frames, operation S220 in which the to-be-reproduced key frame selector 140 selects to-be-reproduced key frames from among the event-preserved key frames, operation S230 in which the key frame position corrector 150 corrects a position of each of the to-be-reproduced key frames, and operation S240 in which the video generator 160 generates a video by performing image rendering.

First, in operation S210, the event-preserved key frame determiner 130 may determine event-preserved key frames using shortened key frames and event key frames.

The shortened key frame determiner 110 may determine the shortened key frames and the event key frame determiner 20 may determine the event key frames.

The shortened key frames may be determined by selecting key frames for every preset interval from among original key frames.

The determining of the shortened key frames may include detecting a motion of a background in the original key frames and calculating camera positions corresponding to the original key frames using the motion of the background.

The determining of the shortened key frames may include determining the shortened key frames by selecting key frames to include one camera position in each preset position interval from among the original key frames using camera positions corresponding to the original key frames.

In an exemplary embodiment, the determining of the shortened key frames may include detecting a motion of a foreground and a motion of a background simultaneously in the original key frames. In this case, key frames in which the motion of the foreground is detected may be determined as the event key frames from among the original key frames.

The determining of the event key frames may include determining the event key frames by selecting key frames corresponding to an event from among the original key frames.

The determining of the event key frames may include detecting a motion of a foreground in the original key frames and determining key frames in which the motion of the foreground is detected from among the original key frames as the event key frames.

In an exemplary embodiment, key frames satisfying a user-defined event condition may be determined as the event key frames from among the original key events.

In operation S210, based on camera positions corresponding to the shortened key frames and camera positions corresponding to the event key frames, when a camera position corresponding to the shortened key frames exists within a preset range from among the camera positions corresponding to the event key frames, it may be determined that the shortened key frames are duplicate key frames and key frames other than the duplicate key frames from among the shortened key frames or the event key frames may be determined as event-preserved key frames.

In operation S220, to-be-reproduced key frames may be selected from among the event-preserved key frames. The number of the to-be-reproduced key frames may vary according to a video reproduction speed.

In operation S230, a position of each of the event-preserved key frames may be corrected to reduce a change in camera position between two adjacent event-preserved key frames using camera positions corresponding to the event-preserved key frames.

In operation S240, a video may be generated by performing image rendering based on the event-preserved key frames.

Although not shown in FIG. 2, the method according to an exemplary embodiment may further include an operation in which when a video reproduction speed is changed during video reproduction, the to-be-reproduced key frame selector 140 (see FIG. 1) reselects to-be-reproduced key frames from among the event-preserved key frames after a time point when the video reproduction speed has been changed so that the number of the to-be-reproduced key frames according to the changed video reproduction speed. In this case, a video may be regenerated in real time when the video reproduction speed is changed during video reproduction by reperforming operations S230 and S240 on the reselected to-be-reproduced key frames.

Figure 3:
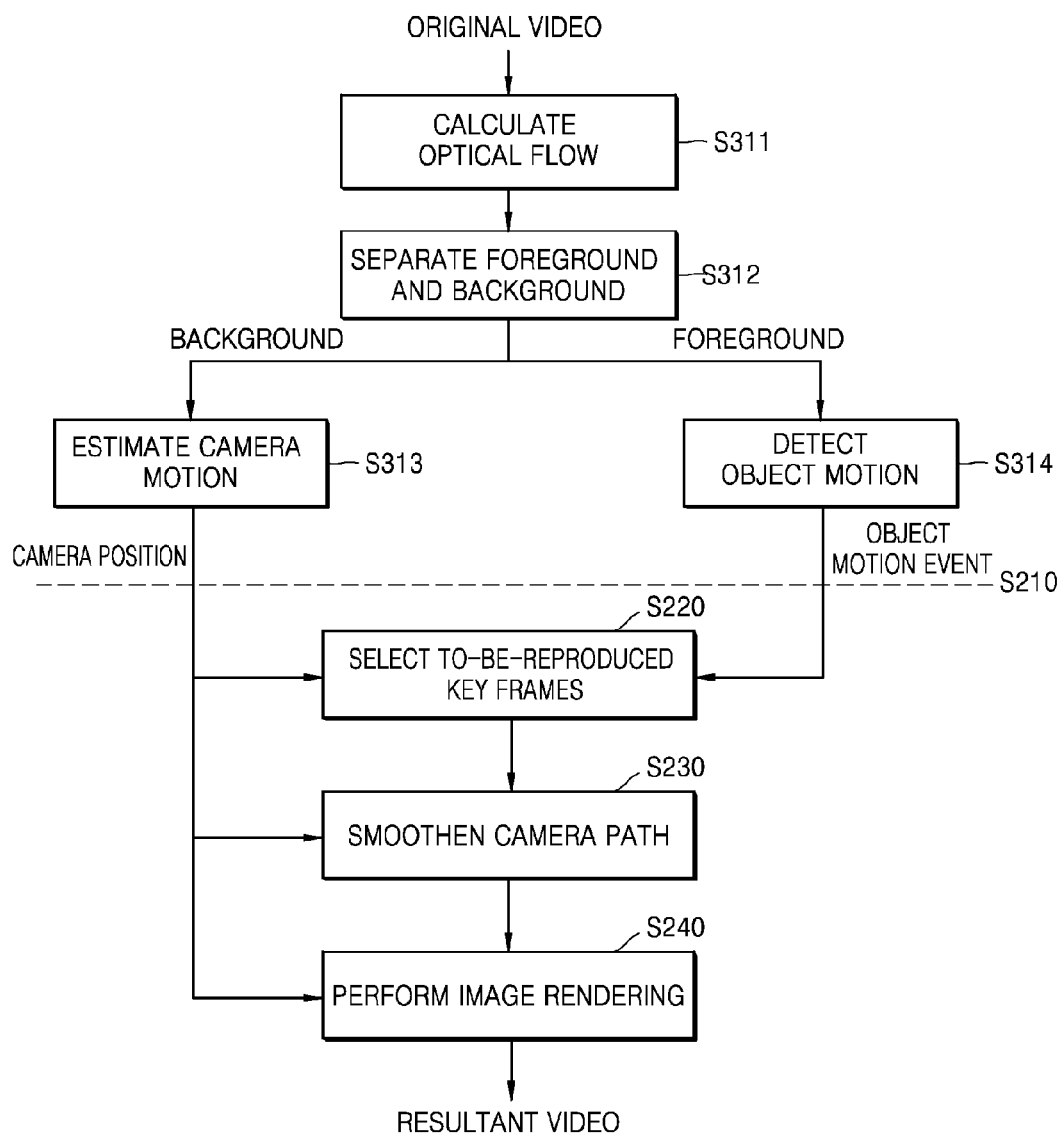
FIG. 3 is a flowchart illustrating a method of shortening a video, according to another exemplary embodiment.

FIG. 3 is a flowchart illustrating a method of shortening a video, according to another exemplary embodiment.

Referring to FIG. 3, an apparatus according to an exemplary embodiment may receive an original video and may output a video after performing an event preservation process and a shortening process.

In operation S311, the apparatus may calculate an optical flow of the original video. The optical flow may be a vector field which characterizes a motion of each pixel by comparing consecutive images. Examples of an algorithm to compare consecutive images may include, but are not limited to, block matching.

In operation S312, the apparatus may separate a foreground and a background in each of original key frames included in the original video using the calculated optical flow.

For example, in operation S312, when pixels that move in similar directions are combined into one pixel group, pixels in each of the original key frames may be separated into a foreground pixel group corresponding to a foreground and a background pixel group corresponding to a background.

In operation S313, the apparatus estimates a camera motion by using a motion of the background pixel group.

In operation S313, a camera position of each of the original key frames may be calculated using the estimated camera motion.

For example, in operation S313, a camera position of a first original key frame may be set as a reference position, camera positions of the other original key frames may be calculated as relative positions to the reference position using the estimated camera motion. As a result, camera positions of all of the original key frames may be calculated.

In operation S314, the apparatus may detect an object motion using a motion of the foreground pixel group.

For example, in operation S314, when a size of the foreground pixel group satisfies a preset group standard or an amount of a motion of the foreground pixel group satisfies a preset motion standard, the apparatus may determine that an object motion event occurs.

Operations S313 and S314 may be performed in any order. Also, operations S313 and S314 may be simultaneously performed.

Operations S210 through S240, which are explained above with reference to FIG. 2, are performed at this point.

In operation S210, the apparatus may determine shortened key frames using camera positions and determine event key frames corresponding to the object motion event.

In operation S220, the apparatus may select to-be-reproduced key frames from among the shortened key frames, which are determined using the camera position, and the event key frames corresponding to the object motion event.

In operation S230, the apparatus may smooth a camera path of the to-be-reproduced key frames.

In operation S230, the camera path that connects camera positions of the to-be-reproduced key frames may be generated and then may be smoothed.

In operation S230, the camera positions of the to-be-reproduced key frames may be adjusted to correspond to the smoothed camera path, and positions of the to-be-reproduced key frames may be adjusted to correspond to the adjusted camera positions.

In operation S240, the apparatus may generate a resultant video, i.e., a shortened video, by performing image rendering on the to-be-reproduced key frames whose positions have been adjusted.

Figure 4:
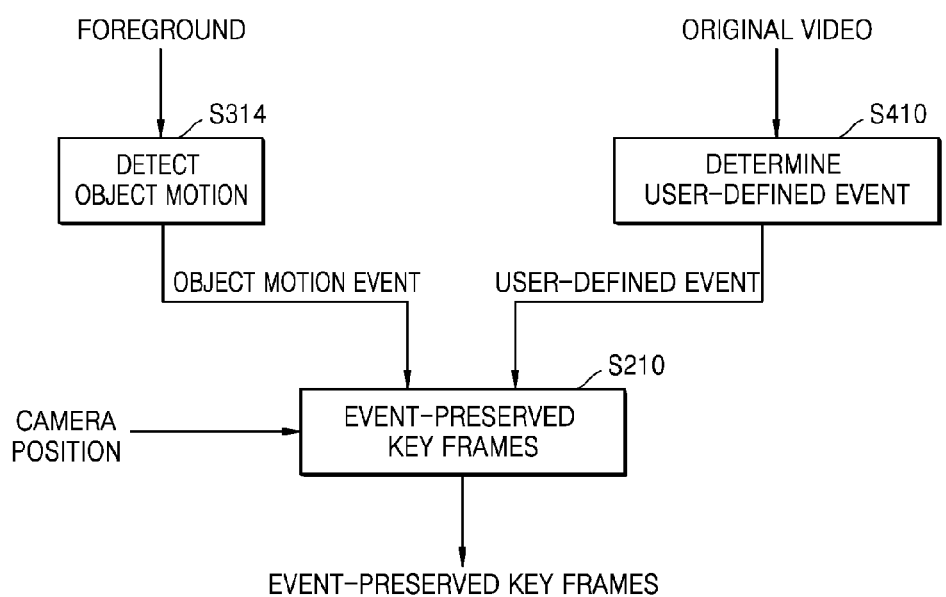
FIG. 4 is a flowchart illustrating a method of determining event-preserved key frames according to an exemplary embodiment.

FIG. 4 is a flowchart illustrating a method of determining event-preserved key frames according to an exemplary embodiment.

Referring to FIG. 4, an apparatus according to an exemplary embodiment may determine event-preserved key frames using an object motion event, a user-defined event, and camera positions.

In operation S314, when an object motion event occurs in an original key frame, the original key frame is determined as a first event key frame.

In operation S410, when a user-defined event occurs in an original key frame, the original key frame is determined as a second event key frame. For example, when an audio event object defined by a user is detected in audio data of an original video or a video event object defined by the user is detected in an original key frame, it may be determined that the user-defined event occurs and the corresponding original key frame may be determined as a second event key frame. Examples of the audio event object may include, but are not limited to, a tire friction sound and a human scream. Examples of the video event object may include, but are not limited to, a human face and a solid object recognizable with a marker.

In operation S210, an event-preserved key frame is determined by summing shortened key frames determined based on camera positions, the first event key frame, and the second event key frame.

In operation S210, a camera position-based duplication range may be set from event key frames, it may be determined that the shortened key frames existing within the duplication range are duplicate key frames, and key frames other than the duplicate key frames may be determined as event-preserved key frames.

Figure 5:
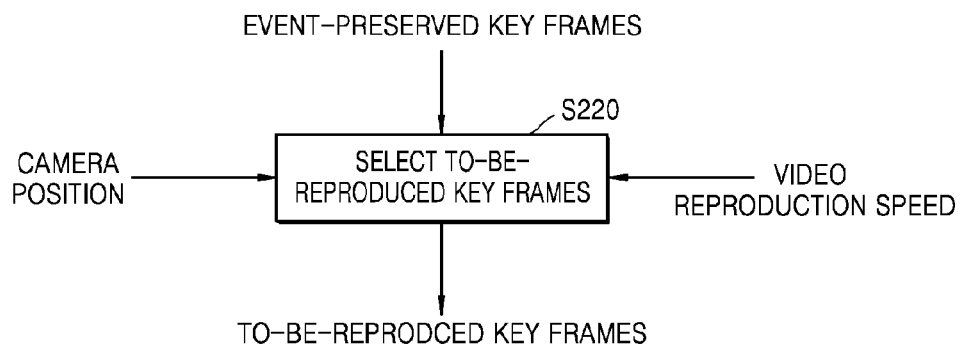
FIG. 5 is a flowchart illustrating a method of selecting to-be-reproduced key frames according to an exemplary embodiment.

FIG. 5 is a flowchart illustrating a method of selecting to-be-reproduced key frames according to an exemplary embodiment.

Referring to FIG. 5, to-be-reproduced key frames may be selected from among event-preserved key frames based on using camera positions and a video reproduction speed.

In operation S220, to-be-reproduced key frames may be selected from among event-preserved key frames and the number of the to-be-reproduced key frames may vary according to a video reproduction speed.

In an exemplary embodiment, in operation S220, when a camera path is set by excluding a specific camera position among camera positions and the specific camera position is spaced from the camera path by a distance exceeding a preset distance, key frames corresponding to the specific camera position may not be selected as to-be-reproduced key frames.

In an exemplary embodiment, in operation S220, when a video reproduction speed is changed during video reproduction, to-be-reproduced key frames may be reselected from among event-preserved key frames which come after the time point when the video reproduction speed has been changed. The number of the to-be-reproduced key frames may correspond to the changed video reproduction speed.

Figure 6:
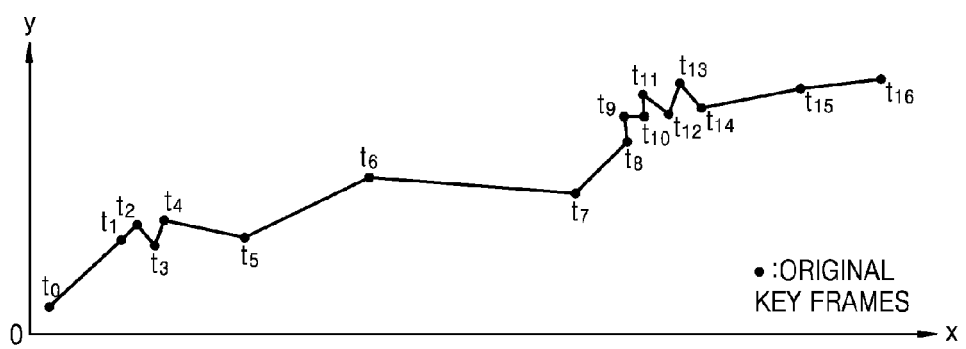
FIG. 6 is a graph illustrating a camera position corresponding to an original key frame, according to an exemplary embodiment.

FIG. 6 is a graph illustrating a camera position corresponding to an original key frame, according to an exemplary embodiment.

Referring to FIG. 6, a camera position corresponding to an original key frame is displayed on a 2D plane.

In another exemplary embodiment, a camera position calculated from an original key frame may be represented differently, e.g., by 3D coordinate values.

One original key frame may correspond to one camera position. For example, 17 original key frames may respectively correspond to camera positions $t_0$ through $t_{16}$.

Camera positions may be relative to a specific position. For example, when the camera position $t_0$ corresponding to a first original key frame is a reference position, the camera positions $t_1$ through $t_{16}$ may be determined based on how much the other original key frames move from the first original key frame.

The camera positions $t_1$ through $t_{16}$ respectively corresponding to the original key frames may be sequentially connected to form a camera path $t_0$-$t_{16}$.

That is, camera positions are calculated from original key frames and a camera path is generated to show how a camera moved while capturing the video.

Figure 7A:
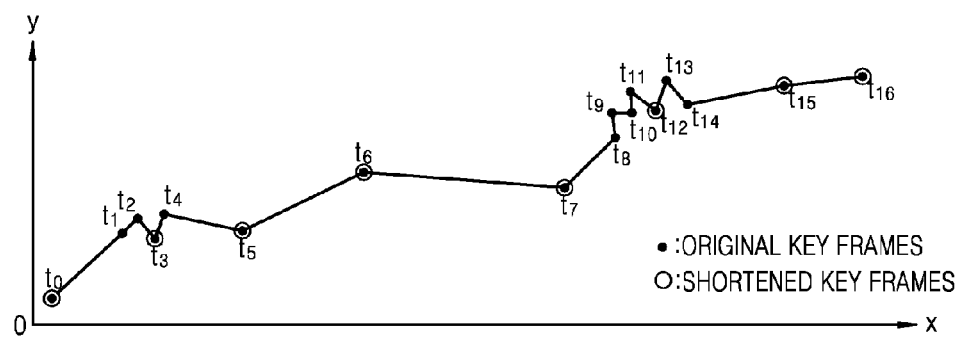
FIGS. 7A through 7C are graphs illustrating a method of determining event-preserved key frames using camera positions, according to an exemplary embodiment.
Figure 7B:
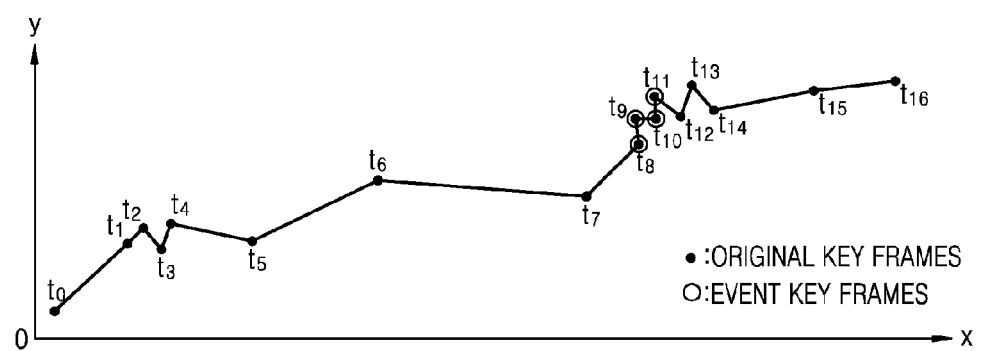
Figure 7C:
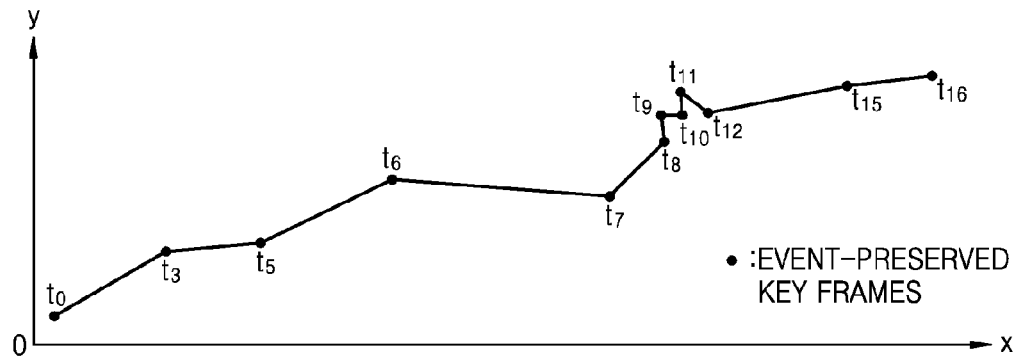

FIGS. 7A through 7C are graphs illustrating a method of determining event-preserved key frames using camera positions, according to an exemplary embodiment.

First, as shown in FIG. 7A, some camera positions among camera positions $t_1$ through $t_{16}$ corresponding to original key frames may be selected as camera positions of shortened key frames.

For example, some camera positions $t_1$, $t_3$, $t_5$, $t_6$, $t_7$, $t_{12}$, $t_{15}$, and $t_{16}$ among the camera positions $t_1$ through $t_{16}$ corresponding to the original key frames may be selected as camera positions of shortened key frames.

The shortened key frames may be determined by selecting camera positions to include one camera position in each preset position interval.

For example, when the camera positions $t_2$ through $t_4$ are included in the same position interval, only one camera position $t_3$ among the camera positions $t_2$ through $t_4$ may be selected as a shortened key frame.

Examples of a method of selecting one camera position for every position interval may include, but are not limited to, selecting a camera position that is the closest to an average position of camera positions included in the corresponding position interval and selecting a camera position corresponding to a first key frame in the same position interval.

Also, some camera positions among the camera positions $t_1$ through $t_{16}$ may be selected as camera positions of event key frames.

For example, referring to FIG. 7B, some camera positions $t_8$ through $t_{11}$ among the camera positions $t_1$ through $t_{16}$ corresponding to the original key frames may be selected as camera positions of event key frames.

The event key frames may be determined by selecting key frames from which an event is detected.

For example, when an object motion is detected in the original key frames corresponding to the camera positions $t_8$ through $t_{11}$, the original key frames may be determined as event key frames.

Next, referring to FIG. 7C, camera positions of event-preserved key frames may be determined using the camera positions $t_1$, $t_3$, $t_5$, $t_6$, $t_7$, $t_{12}$, $t_{15}$, and $t_{16}$ corresponding to the shortened key frames and the camera positions $t_8$ through $t_{11}$ corresponding to the event key frames.

The event-preserved key frames may be determined by summing the shortened key frames and the event key frames.

For example, key frames corresponding to the camera positions $t_1$, $t_3$, $t_5$, $t_6$, $t_7$, $t_8$ through $t_{12}$, $t_{15}$, and $t_{16}$ obtained by summing the camera positions $t_1$, $t_3$, $t_5$, $t_6$, $t_7$, $t_{12}$, $t_{15}$, and $t_{16}$ corresponding to the shortened key frames and the camera positions $t_8$ through $t_{11}$ corresponding to the event key frames may be determined as event-preserved key frames.

Figure 8A:
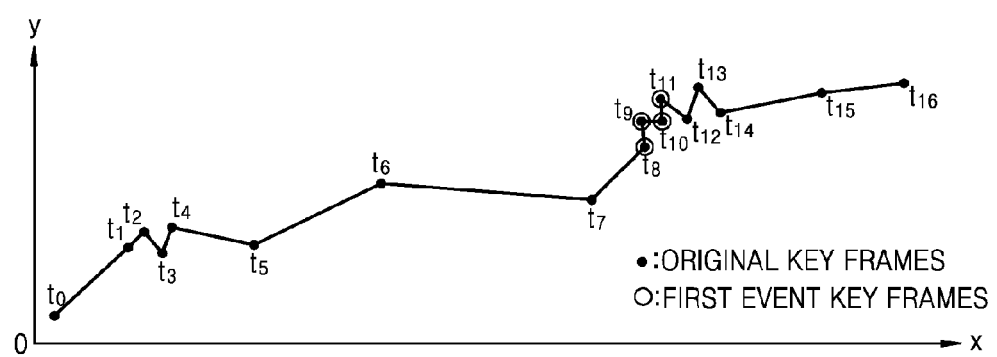
FIGS. 8A through 8C are graphs illustrating a method of determining event key frames using camera positions, according to an exemplary embodiment.
Figure 8B:
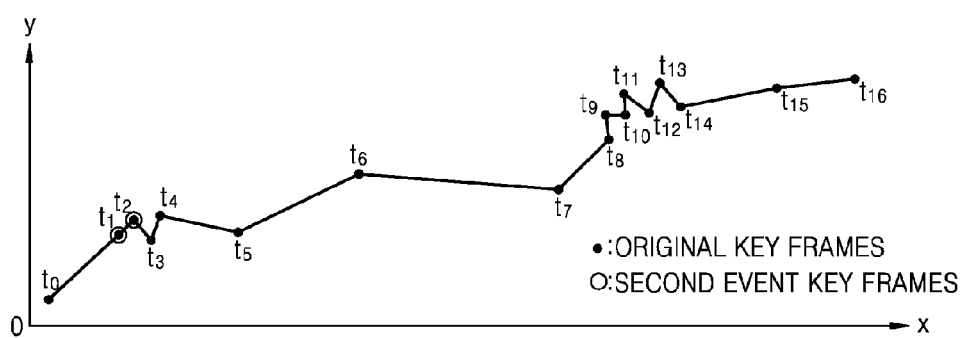
Figure 8C:
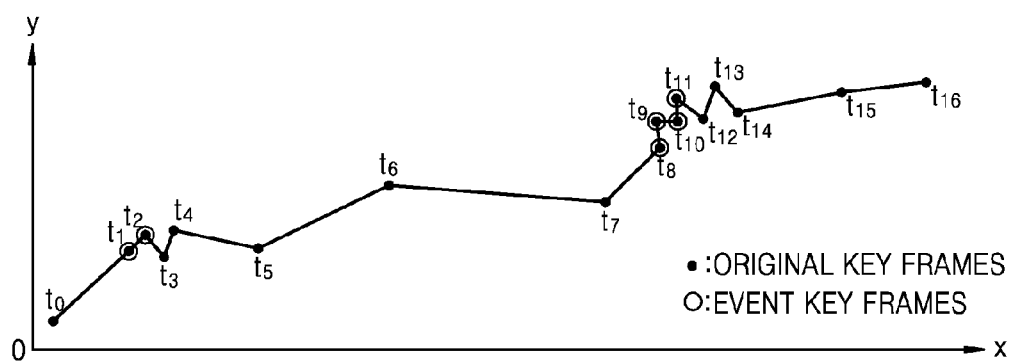

FIGS. 8A through 8C are graphs illustrating a method of determining event key frames using camera positions, according to an exemplary embodiment.

First, as shown in FIG. 8A, key frames from which a first event is detected may be selected as first event key frames. The first event may be an object motion event.

For example, when an object motion is detected in original key frames corresponding to camera positions $t_8$ through $t_{11}$, the corresponding original key frames may be determined as first event key frames.

Also, as shown in FIG. 8B, key frames from which a second event is detected may be selected as second event key frames. The second event may be a user-defined event.

For example, when original key frames corresponding to camera positions $t_1$ and $t_2$ correspond to audio data defined by a user, the original key frames may be determined as second event key frames.

Next, as shown in FIG. 8C, final event key frames may be determined by summing the first event key frames and the second event key frames.

For example, key frames corresponding to the camera positions $t_1$, $t_2$, and $t_8$ through $t_{11}$ obtained by summing the camera positions $t_8$ through $t_{11}$ corresponding to the first event key frames and the camera positions $t_1$ and $t_2$ corresponding to the second event key frames may be determined as final event-preserved key frames.

Figure 9A:
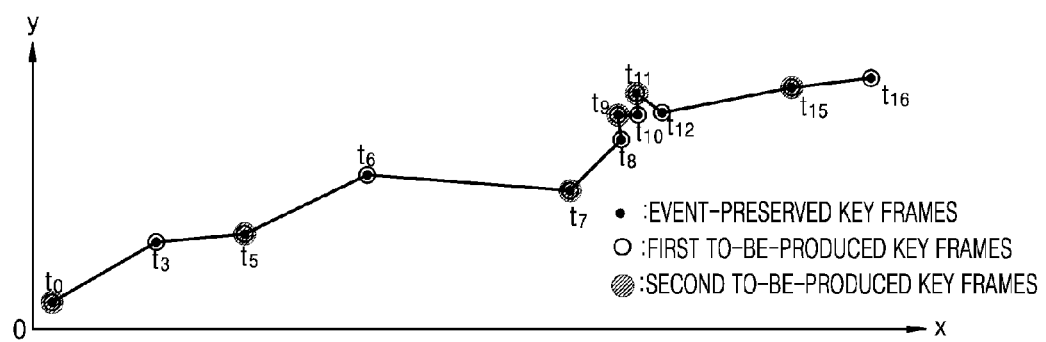
FIGS. 9A through 9C are graphs illustrating a method of correcting positions of key frames using camera positions, according to an exemplary embodiment.
Figure 9B:
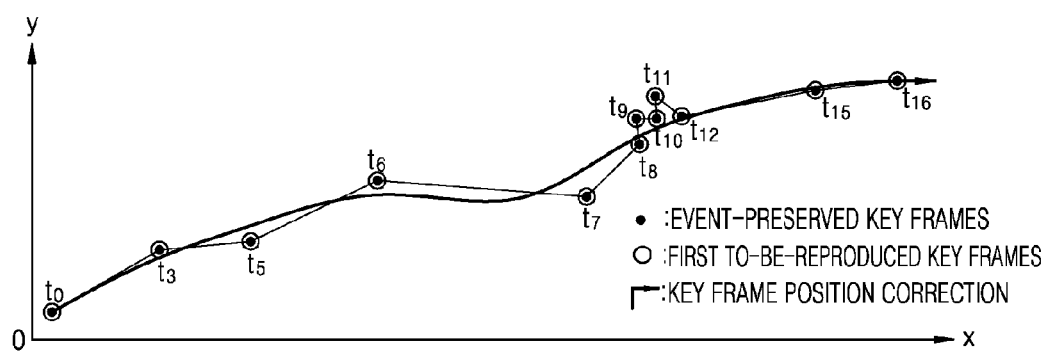
Figure 9C:
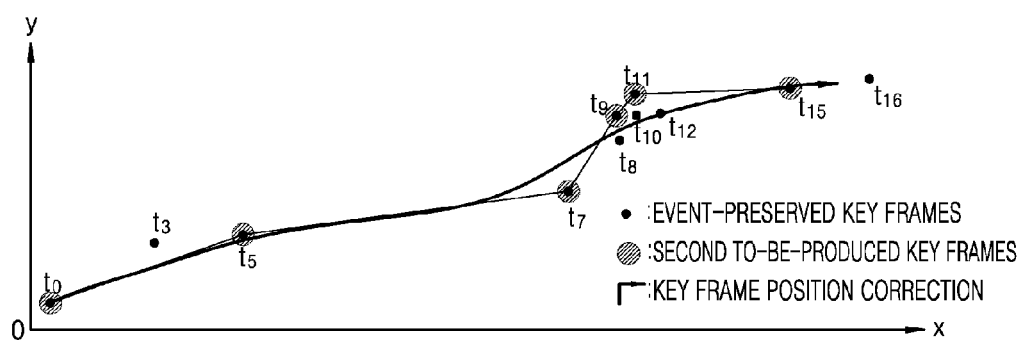

FIGS. 9A through 9C are graphs illustrating a method of correcting positions of key frames using camera positions, according to an exemplary embodiment.

First, as shown in FIG. 9A, to-be-reproduced key frames may be selected from among event-preserved key frames.

The number of the to-be-reproduced key frames may vary according to a video reproduction speed.

For example, 12 key frames may be selected as first to-be-reproduced key frames according to a video reproduction speed of 1×. On the other hand, only 6 key frames may be selected as second to-be-reproduced key frames according to a video reproduction speed of 2×.

Next, as shown in FIG. 9B, a camera path that connects the first to-be-reproduced key frames may be smoothed, and then a position of each key frame may be corrected.

Also, as shown in FIG. 9C, a camera path that connects the second to-be-reproduced key frames may be smoothed, and then a position of each key frame may be corrected.

As such, when video reproduction speeds are different, different to-be-reproduced key frames may be selected, and a position of each key frame may be corrected based on the selected different to-be-reproduced key frames.

Figure 10A:
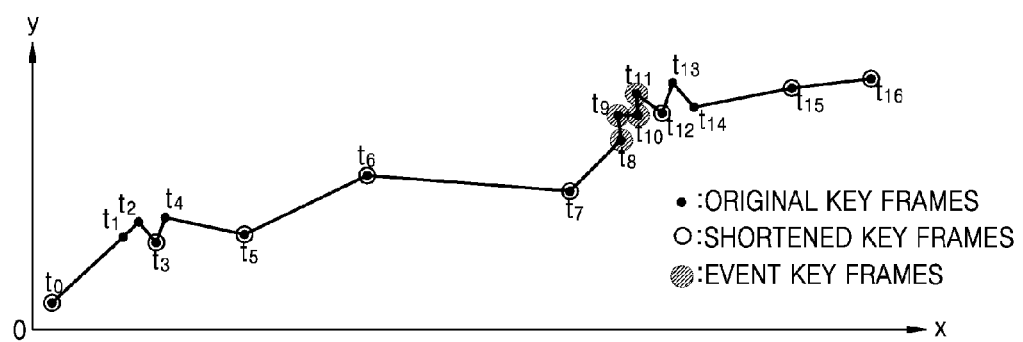
FIGS. 10A through 10C are graphs illustrating a method of removing duplicate key frames using camera positions, according to an exemplary embodiment.
Figure 10B:
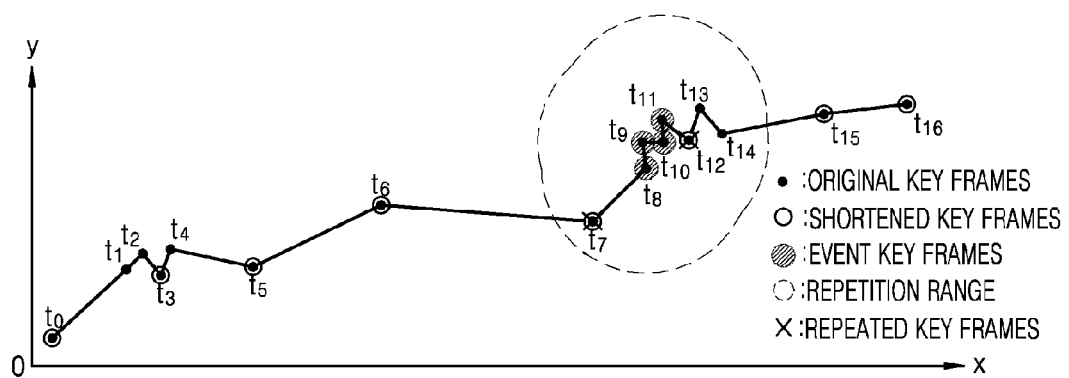
Figure 10C:
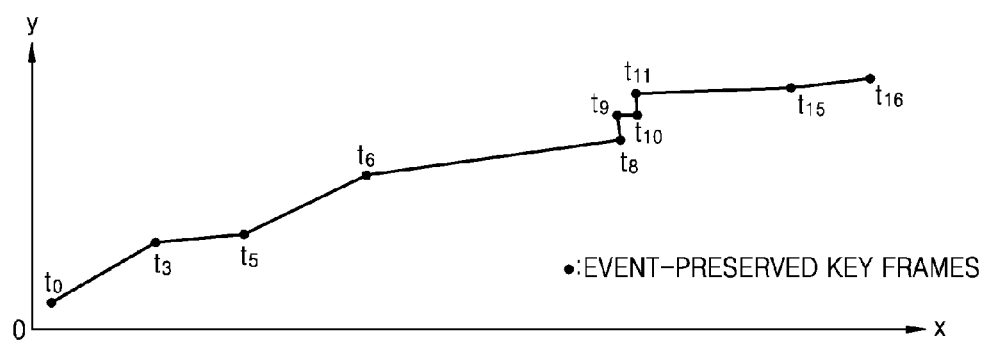

FIGS. 10A through 10C are graphs illustrating a method of removing duplicate key frames using camera positions, according to an exemplary embodiment.

First, as shown in FIG. 10A, shortened key frames and event key frames may be selected from among original key frames.

FIG. 10B is a graph for explaining a process of excluding duplicate key frames from shortened key frames to determine event-preserved key frames.

Referring to FIG. 10B, a preset range may be set as a duplication range from camera positions $t_8$ through $t_{11}$ corresponding to event key frames, it may be determined that shortened key frames corresponding to the camera positions $t_7$ and $t_8$ within the duplication range are duplicate key frames, and the duplication key frames may be excluded to determine event-preserved key frames.

As a result, as shown in FIG. 10C, event-preserved key frames may be determined using shortened key frames other than the duplicate key frames and the event key frames.

Figure 11A:
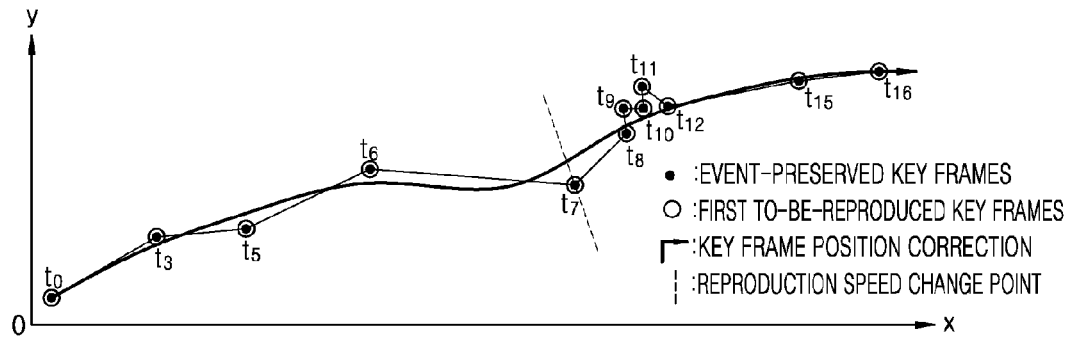
FIGS. 11A and 11B are graphs illustrating a method of changing a reproduction speed using a camera position, according to an exemplary embodiment.
Figure 11B:
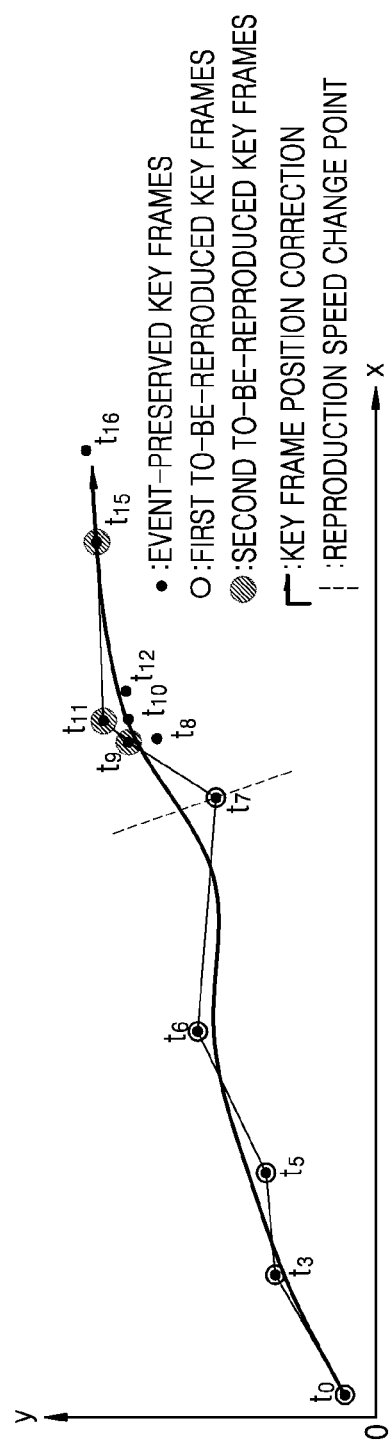

FIGS. 11A and 11B are graphs illustrating a method of changing a reproduction speed using a camera position, according to an exemplary embodiment.

First, as shown in FIG. 11A, when a video reproduction speed is 1×, positions of first to-be-reproduced key frames may be corrected and a video may be generated and reproduced.

When the video reproduction speed is changed from 1× to 2× during video reproduction at $t_7$, to-be-reproduced key frames may be reselected from among event-preserved key frames positioned behind the time point, i.e., $t_7$, when the video reproduction speed has been changed on a time line, as shown in FIG. 11B. That is, after the video reproduction speed has been changed, positions of second to-be-reproduced key frames, instead of the first to-be-reproduced key frames, may be corrected and a video may be generated and reproduced.

A method and an apparatus for shortening a video according to an exemplary embodiment may prevent an event from being lost, when frames are shortened and reproduced, by including event key frames in the shortened video.

The method and apparatus may reduce shaking of image, which frequently occurs when frames are shortened and reproduced, by selecting key frames to reduce a change in camera position.

The method and apparatus may more rapidly reduce shaking of image even when a reproduction speed is changed during video reproduction, by reperforming calculation only on key frames that come after the time point when a reproduction speed has been changed on a time line of the shortened video.

The method of the inventive concept may be implemented as computer programs which may be executed by various computer means, and recorded on a computer-readable recording medium. Examples of the computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Furthermore, examples of the computer-readable recording medium include intangible media that may be transmitted through a network. For example, the computer-readable recording medium may be implemented as software or an application and may be transmitted and distributed through a network.

The program commands recorded on the computer-readable recording medium may be specially designed and constructed for the inventive concept or may be known to and usable by one of ordinary skill in a field of computer software. Examples of the computer programs include a high-level language code that may be executed by a computer using an interpreter as well as a machine language code made by a compiler.

The particular implementations shown and described herein are illustrative examples of the inventive concept and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

While one or more exemplary embodiments have been described with reference to the figures, it will be understood by those of ordinary skill in the art that various is changed in form and details may be made therein without departing from the spirit and scope of the inventive concept as defined by the following claims.

What is claimed is:

1. A method of shortening a video, the method comprising:
   determining shortened key frames by selecting one key frame, for every preset time interval on a time line of the video or for every preset position interval of a camera which captures the video, from among original key frames of the video;
   determining event key frames from which an event is detected, from among the original key frames;
   determining event-preserved key frames using the shortened key frames and the event key frames; and
   generating a shortened video using the event-preserved key frames.

2. The method of claim 1, the generating comprises correcting a position of each of the event-preserved key frames on a timeline of the shortened video to reduce a change in camera position between two adjacent event-preserved key frames based on camera positions corresponding to the event-preserved key frames.

3. The method of claim 1, the generating comprises selecting to-be-reproduced key frames, which are included in the shortened video, from among the event-preserved key frames so that a number of the to-be-reproduced key frames corresponds to a video reproduction speed.

4. The method of claim 1, wherein the determining of the event key frames comprises determining key frames in which a motion of a foreground is detected, from among the original key frames, as the event key frames.

5. The method of claim 1, wherein the determining of the event key frames comprises determining key frames satisfying a preset event condition from among the original key frames as the event key frames.

6. The method of claim 1, wherein the determining of the shortened key frames comprises selecting one key frame among one or more original key frames which are captured at camera positions within each preset position interval.

7. The method of claim 6, wherein the determining of the shortened key frames comprises:
   detecting a motion of a background in the original key frames; and
   calculating camera positions corresponding to the original key frames based on the motion of the background.

8. The method of claim 7, wherein the determining of the shortened key frames comprises detecting a motion of a foreground and a motion of a background in the original key frames, and
   wherein the determining of the event key frames comprises determining key frames in which the motion of the foreground is detected, from among the original key frames, as the event key frames.

9. The method of claim 3, further comprising, when the video reproduction speed is changed during reproduction of the shortened video, reselecting the to-be-reproduced key frames from among the event-preserved key frames that come after a time point when the video reproduction speed has been changed on a time line of the shortened video so that a number of the reselected to-be-reproduced key frames corresponds to the changed video reproduction speed.

10. The method of claim 1, wherein the generating comprises performing image rendering based on the event-preserved key frames.

11. The method of claim 1, wherein the determining of the event-preserved key frames comprises:
   determining camera positions corresponding to the shortened key frames and camera positions corresponding to the event key frames; and
   determining the duplicate key frames from among the shortened key frames, camera positions of the duplicate key frames existing within a preset range from camera positions of the event key frames.

12. An apparatus for shortening a video, the apparatus comprising:
   at least one processor configured to implement:
      a shortened key frame determiner configured to determine shortened key frames by selecting one key frame, for every preset time interval on a time line of the video or for every preset position interval of a camera which captures the video, from among original key frames of the video;
      an event key frame determiner configured to determine event key frames from which an event is detected, from among the original key frames;
      an event-preserved key frame determiner configured to determine event-preserved key frames using the shortened key frames and the event key frames; and
      a video generator configured to generate a shortened video using the event-preserved key frames.

13. The apparatus of claim 12, wherein the at least one processor is further configured to implement a key frame position corrector configured to correct a position of each of the event-preserved key frames on a timeline of the shortened video to reduce a change in camera position between two adjacent event-preserved key frames based on camera positions corresponding to the event-preserved key frames.

14. The apparatus of claim 12, wherein the at least one processor is further configured to implement a to-be-reproduced key frame selector configured to select to-be-reproduced key frames, which are included in the shortened video, from among the even-preserved key frames so that a number of the to-be-reproduced key frames corresponds to a video reproduction speed.

15. The apparatus of claim 12, wherein the event key frame determiner determines key frames in which a motion of a foreground is detected, from among the original key frames, as the event key frames.

16. The apparatus of claim 12, wherein the event key frame determiner determines key frames satisfying a preset event condition from among the original key frames as the event key frames.

17. The apparatus of claim 12, wherein the shortened key frame determiner selects one key frame among one or more original key frames which are captured at camera positions within each preset position interval.

18. The apparatus of claim 17, wherein the shortened key frame determiner detects a motion of a background in the original key frames and calculates camera positions corresponding to the original key frames based on the motion of the background.

19. The apparatus of claim 18, wherein the shortened key frame determiner detects a motion of a foreground and a motion of a background in the original key frames, and
   wherein the event key frame determiner determines key frames in which the motion of the foreground is detected, from among the original key frames, as the event key frames.

20. The apparatus of claim 14, wherein when the video reproduction speed is changed during reproduction of the shortened video,
   the to-be-reproduced key frame selector reselects the to-be-reproduced key frames from among the event-preserved key frames that come after a time point when the video reproduction speed has been changed on a time line of the shortened video so that a number of the reselected to-be-reproduced key frames corresponds to the changed video reproduction speed.

* * * * *